(12) United States Patent
Xie et al.

(10) Patent No.: US 10,469,583 B2
(45) Date of Patent: Nov. 5, 2019

(54) DATA STORAGE METHOD AND DEVICE

(71) Applicant: BEIJING BAIDU NETCOM SCIENCE AND TECHNOLOGY CO., LTD., Beijing (CN)

(72) Inventors: Guangjun Xie, Beijing (CN); Baisheng Wang, Beijing (CN); Zhiyong Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 214 days.

(21) Appl. No.: 15/550,851

(22) PCT Filed: Oct. 12, 2015

(86) PCT No.: PCT/CN2015/091773
§ 371 (c)(1),
(2) Date: Aug. 14, 2017

(87) PCT Pub. No.: WO2016/188014
PCT Pub. Date: Dec. 1, 2016

(65) Prior Publication Data
US 2018/0020053 A1    Jan. 18, 2018

(30) Foreign Application Priority Data

May 27, 2015    (CN) .......................... 2015 1 0278937

(51) Int. Cl.
*H04L 29/06* (2006.01)
*H04L 29/08* (2006.01)

(52) U.S. Cl.
CPC .......... *H04L 67/1097* (2013.01); *H04L 67/28* (2013.01); *H04L 67/42* (2013.01); *H04L 2212/00* (2013.01)

(58) Field of Classification Search
None
See application file for complete search history.

(56) References Cited

U.S. PATENT DOCUMENTS

| | | | | |
|---|---|---|---|---|
| 7,555,558 B1* | 6/2009 | Kenrich | ............... | H04L 67/06 709/203 |
| 8,943,506 B2* | 1/2015 | Tang | .................. | G06F 9/45558 718/1 |
| 2007/0050591 A1* | 3/2007 | Boyd | .................... | G06F 9/461 711/171 |

(Continued)

FOREIGN PATENT DOCUMENTS

| CN | 103927489 | 7/2014 |
|---|---|---|
| CN | 104092759 A | 10/2014 |

(Continued)

*Primary Examiner* — Joshua Joo
(74) *Attorney, Agent, or Firm* — Hodgson Russ LLP

(57) ABSTRACT

The present disclosure provides a data storage method and device. The data storage method includes: receiving data by a simulating device from a client operating system; encapsulating the data in a user space of a host system according to a protocol used by a storage server; and sending the encapsulated data to the storage server for storage. The method can realize storing data in the storage server, thereby shortening the I/O path, improving the I/O throughput of a system, reducing the CPU load, and optimizing the system performance.

13 Claims, 2 Drawing Sheets

(56) References Cited

U.S. PATENT DOCUMENTS

| | | | |
|---|---|---|---|
| 2010/0205244 A1* | 8/2010 | Todorov | H04L 41/0226 709/203 |
| 2011/0307886 A1 | 12/2011 | Thanga et al. | |
| 2013/0268545 A1* | 10/2013 | Burchett | G06F 16/258 707/754 |
| 2015/0089172 A1* | 3/2015 | Kulkarni | G06F 3/065 711/162 |
| 2015/0242228 A1* | 8/2015 | Voccio | G06F 9/461 711/114 |
| 2015/0248307 A1* | 9/2015 | Sahota | G06F 9/45545 718/1 |
| 2016/0299702 A1* | 10/2016 | Chawla | G06F 9/45533 |

FOREIGN PATENT DOCUMENTS

| | | |
|---|---|---|
| CN | 104636076 A | 5/2015 |
| CN | 104881254 A | 9/2015 |

* cited by examiner

DATA STORAGE METHOD AND DEVICE

CROSS-REFERENCE TO RELATED APPLICATION

This application is a national phase entry under 35 USC § 371 of International Application No. PCT/CN2015/091773, filed Oct. 12, 2015, which claims priority to and benefits of Chinese Patent Application Serial No. 201510278937.X, titled with "data storage method and device", filed with the State Intellectual Property Office of P. R. China on May 27, 2015 by Baidu Online Network Technology (Beijing) Co., Ltd., the entire disclosures of which are incorporated herein by reference.

FIELD

The present disclosure relates to the field of Internet technology, and more specifically, to a method and a device for data storage.

BACKGROUND

For a virtual operating system, in order to ensure the reliability of its data, the data needs to be saved in a more reliable cloud storage server. In addition, saving the storage in another location is also a sufficient condition for the migration of the virtual operating system.

However, input and output (Input Output; hereinafter referred to as: IO) are essential to system performance, and thus when moving storage from local to cloud storage on the network, the resulting loss of performance need to be minimized.

Technical solutions in the related art generally use ISCSI (Internet Small Computer System Interface) to create a SCSI (Small Computer System Interface) device on a local physical machine, and assign this device to the virtual operating system. The SCSI device sends SCSI commands to an ISCSI target via ISCSI at a bottom layer, which generally involves protocol exchange between SCSI commands and cloud storage server protocol, since the cloud storage server usually has its own data exchange protocol. The ISCSI target can be deployed on a local or a fixed server, or on the cloud storage server. However, aforesaid solutions increase the length of the IO path, increase the load on the CPU (Central Processing Unit), and consume relatively more system performance.

SUMMARY

The present disclosure seeks to solve at least one of the problems existing in the related art to at least some extent.

Accordingly, a first objective of the present disclosure is to provide a method for data storage. The method may realize the data storage in a storage server, thus shortening the IO path, increasing the IO throughput of the system, reducing the load on the CPU and optimizing the system performance.

A second objective of the present disclosure is to provide a device for data storage.

In order to achieve the above objectives, embodiments according to a first aspect of the present disclosure provides a method for data storage, including: receiving data by a simulating device from a client operating system; encapsulating the data in a user space of a host system according to a protocol used by a storage server; and sending the encapsulated data to the storage server for storage.

With the method for data storage according to embodiments of the present disclosure, after receiving data from the client operating system, the simulating device encapsulates the data in the user space of the host system according to the protocol used by the storage server, and then sends the encapsulated data to the storage server for storage, thus realizing the data storage in a storage server, shortening the IO path, increasing the system throughput, reducing the load on the CPU and optimizing the system performance.

In order to achieve the above objectives, embodiments according to a second aspect of the present disclosure provide a device for data storage. The device for data storage is configured in a simulating device, and includes: a receiving module, configured to receive data from a client operating system; an encapsulating module, configured to encapsulate the data received by the receiving module in a user space of a host system according to a protocol used by a storage server; and a sending module, configured to send the data encapsulated by the encapsulating module to the storage server for storage.

The device for data storage according to embodiments of the present disclosure is achieved as a simulating device in a virtual machine monitor. After the receiving module receives data, the encapsulating module encapsulates the data in a user space of a host system according to a protocol used by a storage server, and then the sending module sends the encapsulated data to the storage server for storage, thus realizing the data storage in a storage server, shortening the IO path, increasing the system IO throughput, reducing the load on the CPU and optimizing the system performance.

In order to achieve the above objectives, embodiments according to a third aspect of the present disclosure provides an electronic device, including: one or more processors, a memory, and one or more programs stored in the memory that, when executed by the one or more processors, perform the following operations: receiving data by a simulating device from a client operating system; encapsulating the data in a user space of a host system according to a protocol used by a storage server; and sending the encapsulated data to the storage server for storage.

In order to achieve the above objectives, embodiments according to a fourth aspect of the present disclosure provides a non-volatile computer storage medium, stored with one or more modules that, when executed, perform the following operations: receiving data by a simulating device from a client operating system; encapsulating the data in a user space of a host system according to a protocol used by a storage server; sending the encapsulated data to the storage server for storage.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

Above and/or other aspects and advantages of the present disclosure will become apparent and more easily to understand from the following descriptions of the embodiments of the present disclosure with reference to the drawings, wherein.

DETAILED DESCRIPTION

Figure 1:
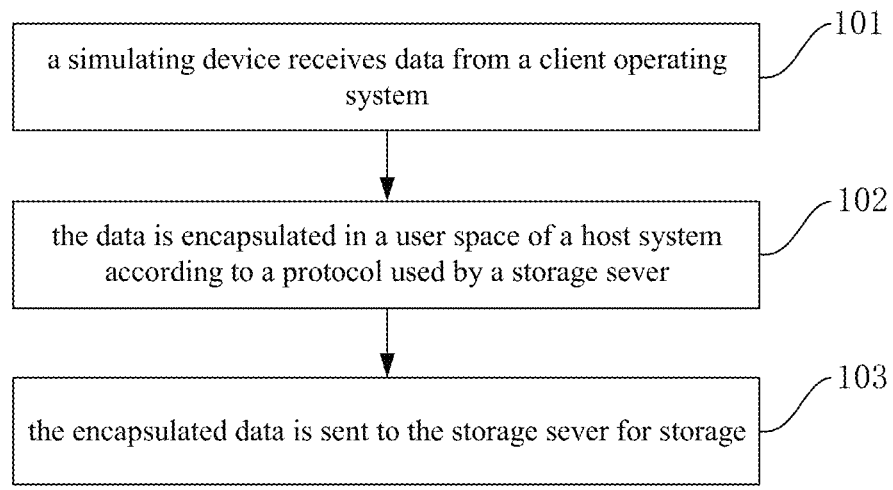
FIG. 1 is a flow chart showing a method for data storage according to an embodiment of the present disclosure.

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory, serve to explain the present disclosure, and are not construed to limit embodiments of the present disclosure. Instead, the embodiments of the present disclosure comprise all the variants, modifications, and their equivalents within the spirit and scope of the present disclosure as defined by the claims.

FIG. 1 is a flow chart showing a method for data storage according to an embodiment of the present disclosure. As shown in FIG. 1, the method for data storage may include followings.

At Step 101, a simulating device receives data from a client operating system.

At Step 102, the data is encapsulated in a user space of a host system according to a protocol used by a storage server.

At Step 103, the encapsulated data is sent to the storage server for storage.

In this embodiment, the simulating device is achieved on the host system based on a virtual machine monitor, such as a quick simulator (hereinafter referred to as Qemu). The simulating device is a block device of a Peripheral Component Interconnect standard (hereinafter referred to as PCI) interface. The client operating system drives the simulating device using a block device driver, and the client operating system is running on the virtual machine monitor.

Figure 2:
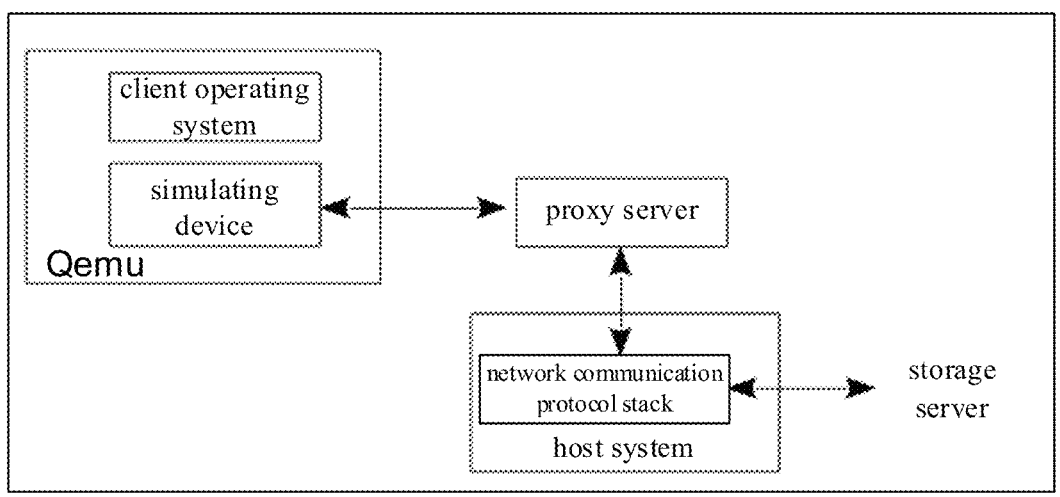
FIG. 2 is a schematic diagram shows an application scenario of a method for data storage according to an embodiment of the present disclosure.

The method for data storage provided by the embodiment shown in FIG. 1 could be applied in an architecture shown in FIG. 2, which is a schematic diagram showing an application scenario of a method for data storage according to an embodiment of the present disclosure.

With reference to FIG. 2, the present disclosure designs and implements a simulating device based on a virtual machine monitor Qemu. In order to avoid modifying the client operating system and reduce the influence on the client operating system, the simulating device is emulated as a block device, such that there is no need to achieve a driver for the simulating device in the client operating system, and the simulating device can be driven by the block device driver directly. In order to realize more efficient communication between the client operating system and the host system, the simulating device uses virtual input and output (VirtIO) standard to realize data communication. In order to avoid the influence from upgrading the storage server, the simulating device is decoupled from the storage server, and a proxy server for the storage server is designed and implemented on the host system in the present disclosure.

In order to make the client operating system be capable of using the method provided in the embodiment shown in FIG. 1 without modification, which is especially meaningful for those user-defined client operating systems, the simulating device is registered as a VirtIO block device of the PCI interface in the present disclosure. When the client operating system finds that it is a VirtIO block device on a PCI bus, a virtual input and output block device (virtio-blk) driver will be used to drive the simulating device.

In the embodiment shown in FIG. 1, the simulating device and the client operating system share memory by a means of VirtIO, and data access is realized by passing a physical address of a memory stored with the data between the simulating device and the client operating system, thus achieving zero copy of data.

In the embodiment shown in FIG. 1, sending the encapsulated data to the storage server for storage may be implemented as follows. The simulating device sends the encapsulated data to the storage server for storage through a network communication protocol stack.

In the present disclosure, after the simulating device receives the data, the simulating device encapsulates the data in the user space of the host system according to the protocol of the storage server, and then directly sends the encapsulated data to the remote storage server through the network communication protocol stack, instead of through the kernel IO stack of the host system. In addition, IO path in Qemu is optimized in the present embodiment and the IO path is shortened.

Specifically, the simulating device may send the encapsulated data to the storage server for storage through the network communication protocol stack as follows. The simulating device sends the encapsulated data to a proxy server of the storage server, and the proxy server sends the encapsulated data to the storage server for storage through the network communication protocol stack. The network communication protocol stack may be Transmission Control Protocol (hereinafter referred to as TCP)/Internet Protocol (hereinafter referred to as IP) protocol stack. Certainly, the present disclosure is not limited to that, and the network communication protocol stack may also be other network communication protocol stack, as long as it can realize network communication between the simulating device and the storage server.

Since frequent upgrade of Qemu has both high cost and high risk in a production environment, the present disclosure implements a proxy server of the storage server between the simulating device and the remote storage server, thus separating the service logic into the proxy server. Since only simple data communication is carried between the proxy server and the simulating device in Qemu, which is not influenced by particulars modification of specific communication protocol, there is no need to change the Qemu either when the protocol is upgraded or when defect is repaired.

In order to increase IO throughput, control plane and data channel are implemented separately in the present disclosure, and a separate dedicated thread is used to be responsible for the data channel, thus avoiding control command occupation. In the embodiment shown in FIG. 1, the proxy server uses an extensible architecture, and each simulating device as described above corresponds to one process. In this way, when there are a plurality of client operating systems or a plurality of simulating devices in one host computer, multiple CPUs of the host system can be utilized fully, thus improving parallelism and increasing the overall IO throughput.

The proxy server may need to upgrade according to the upgrade of the storage protocol or may be accidentally restarted because of defects. However, no matter what situation happens, if it is not handled, then what reflects in the client operating system will be an IO error. To improve reliability, a fault-tolerant mechanism is designed and implemented in the present disclosure. The simulating device senses the status of the proxy server in real time, and after the proxy server is restarted, no matter due to upgrade or due to accidence, the simulating device retransmits unfinished IO request. That is, after the proxy server is restarted, the simulating device retransmits the data that is not transmitted completely before the proxy server is restarted.

For a back-end storage server, different blocks may be stored in different machines, and thus in order to improve overall parallelism, an IO scheduling algorithm is designed for the client operating system and the simulating device in the present disclosure. In addition to merging adjacent requests in the same block, requests in different blocks may also be sent to the storage server, so that different storage servers could be scheduled by the back-end, thus improving the overall concurrency, and increasing the overall IO throughput. This optimization is optional, because it involves modifying the client operating system, and if the client operating system remains unchanged, implementation of other parts of the method for data storage provided in the embodiment shown in FIG. 1 will not be affected.

In above data storage method, after the simulating device receives data from the client operating system, the simulating device encapsulates the data in the user space of the host system according to the protocol used by the storage server, and then sends the encapsulated data to the storage server for storage, thus realizing storing the data in the storage server, shortening the IO path, increasing the system IO throughput, reducing the load on the CPU, and optimizing the system performance.

Figure 3:
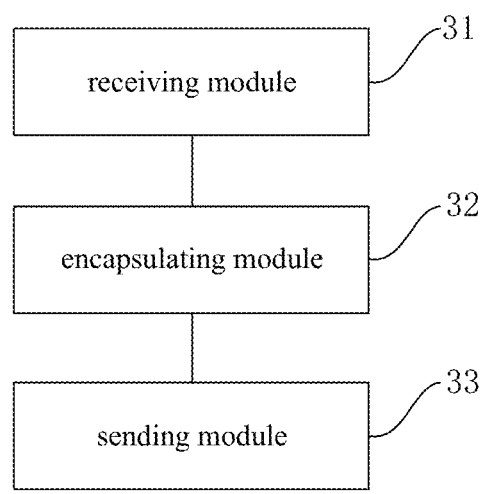
FIG. 3 is a block diagram of a device for data storage according to an embodiment of the present disclosure.

FIG. 3 is a block diagram of a device for data storage according to an embodiment of the present disclosure. The device for data storage in this embodiment is achieved as a simulating device in a virtual machine monitor which can implement the process in the embodiment shown in FIG. 1. As shown in FIG. 3, the device for data storage may include a receiving module 31, an encapsulating module 32 and a sending module 33.

The receiving module 31 is configured to receive data from a client operating system.

The encapsulating module 32 is configured to encapsulate the data received by the receiving module 31 in a user space of a host system according to a protocol used by a storage server.

The sending module 33 is configured to send the data encapsulated by the encapsulating module 32 to the storage server for storage.

In this embodiment, the simulating device is achieved on the host system based on a virtual machine monitor, such as a Qemu. The simulating device is a block device of a PCI interface. The client operating system drives the simulating device using a block device driver, and the client operating system is running on the virtual machine monitor.

With reference to FIG. 2, the present disclosure designs and implements a simulating device based on a virtual machine monitor Qemu. In order to avoid modifying the client operating system and reduce the influence on the client operating system, the simulating device is emulated as a block device, such that there is no need to achieve a driver for the simulating device in the client operating system, and the simulating device can be driven by the block device driver directly. In order to realize more efficient communication between the client operating system and the host system, the simulating device uses virtual input and output (VirtIO) standard to realize data communication. In order to avoid the influence from upgrading the storage server, the simulating device is decoupled from the storage server, and a proxy server for the storage server is designed and implemented on the host system in the present disclosure.

In order to make the client operating system be capable of using the method provided in the embodiment shown in FIG. 1 without modification, which is especially meaningful for those user-defined client operating systems, the simulating device is registered as a VirtIO block device of the PCI interface in the present disclosure. When the client operating system finds that it is a VirtIO block device on a PCI bus, a virtual input and output block device (virtio-blk) driver will be used to drive the simulating device.

In the embodiment, the simulating device and the client operating system share memory by a means of VirtIO, and data access is realized by passing a physical address of a memory stored with the data between the simulating device and the client operating system, thus achieving zero copy of data.

In the device for data storage, the sending module 33 is specifically configured to send the data encapsulated by the encapsulating module 32 to the storage server for storage through a network communication protocol stack. In this embodiment, after the receiving module 31 receives the data, the data does not pass through the kernel IO stack of the host system. Instead, the encapsulating module 32 encapsulates the data in the user space of the host system according to the protocol of the storage server, and then the sending module 33 directly sends the encapsulated data to the remote storage server through the network communication protocol stack. In addition, IO path in Qemu is optimized in the present embodiment, and the IO path is shortened.

More specifically, the sending module 33 is configured to send data encapsulated by the encapsulating module 32 to a proxy server of the storage server, and the proxy server sends the encapsulated data to the storage server for storage through the network communication protocol stack. The network communication protocol stack may be TCP/IP protocol stack. Certainly, the present disclosure is not limited to this, and the network communication protocol stack may also be other network communication protocol stack, as long as it can realize network communication between the simulating device and the storage server.

Since frequent upgrade of Qemu has both high cost and high risk in a production environment, the present disclosure implements a proxy server of the storage server between the simulating device and the remote storage server, thus separating the service logic into the proxy server. Since only simple data communication is carried between the proxy server and the simulating device in Qemu, which is not influenced by particulars modification of specific communication protocol, there is no need to change the Qemu either when the protocol is upgraded or when defect is repaired.

In order to increase IO throughput, control plane and the data channel are implemented separately in the present disclosure, and a separate dedicated thread is used to be responsible for the data channel, thus avoiding control command occupation. In this embodiment, the proxy server may use an extensible architecture, and each simulating device described as above corresponds to one process. In this way, when there are a plurality of client operating systems or a plurality of simulating devices in one host system, the multiple CPUs of the host system can be utilized fully, thus improving parallelism and increasing the overall IO throughput.

In the device for data storage, the sending module 33 is further configured to retransmit the data that is not transmitted completely before the proxy server is restarted, after the proxy server is restarted. The proxy server may need to upgrade according to the upgrade of the storage protocol or may be accidentally restarted because of defects. However, no matter what situation happens, if it is not handled, then what reflects in the client operating system will be an IO error. To improve reliability, a fault-tolerant mechanism is designed and implemented in the device for data storage. The status of the proxy server is sensed in real time, and after the proxy server is restarted, no matter due to upgrade or due to accidence, the sending module 33 retransmits the unfinished IO operation.

In the device for data storage, after the receiving module 31 receives data from the client operating system, the encapsulating module 32 encapsulates the data in the user space of the host system according to the protocol used by the storage server, and then the sending module 33 sends the encapsulated data to the storage server for storage, thus realizing storing the data in the storage server, shortening the IO path, increasing the system IO throughput, reducing the load on the CPU and optimizing the system performance.

Embodiments of the present disclosure also provide an electronic device, including: one or more processors, a memory, and one or more programs stored in the memory that when executed by the one or more processors, perform the following operations: receiving data by a simulating device from a client operating system; encapsulating the data in a user space of a host system according to a protocol used by a storage server; sending the encapsulated data to the storage server for storage.

Embodiments of the present disclosure also provide a non-volatile computer storage medium, stored with one or more modules, when executed, perform the following operations: receiving data by a simulating device from a client operating system; encapsulating the data in a user space of a host system according to a protocol used by a storage server; and sending the encapsulated data to the storage server for storage.

It should be noted that in the description of the present disclosure, terms such as "first" and "second" are used herein for purposes of description and are not intended to indicate or imply relative importance or significance or to imply the number of indicated technical features. In addition, in the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated into a processing module, or these cells may be separate physical existence, or two or more cells are integrated into a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. A method for data storage, comprising:
receiving data by a simulating device from a client operating system;
encapsulating by the simulating device, the data in a user space of a host system according to a protocol used by a storage server;
sending by the simulating device, encapsulated data to the storage server for storage;
wherein, the simulating device is achieved on the host system based on a virtual machine monitor, the simulating device is a block device of a Peripheral Component Interconnect standard PCI interface, the client operating system is configured to drive the simulating device using a block device driver, and the client operating system is running on the virtual machine monitor.

2. The method according to claim 1, wherein, data is transferred between the simulating device and the client operating system by a means of sharing memory, and data access is realized by passing a physical address of a memory stored with the data between the simulating device and the client operating system.

3. The method according to claim 1, wherein, sending the encapsulated data to the storage server for storage comprises:
sending the encapsulated data by the simulating device to the storage server for storage through a network communication protocol stack.

4. The method according to claim 3, wherein, sending the encapsulated data by the simulating device to the storage server for storage through a network communication protocol stack comprises:
   sending the encapsulated data by the simulating device to a proxy server of the storage server, and sending the encapsulated data by the proxy server to the storage server for storage through a network communication protocol stack.

5. The method according to claim 4, wherein, the proxy server is configured to use an extensible architecture, and the simulating device corresponds to one process.

6. The method according to claim 4, further comprising:
   when the proxy server restarts to upgrade or by defect, retransmitting by the simulating device, the data that is not transmitted completely before the proxy server is restarted.

7. An electronic device, comprising:
   one or more processors,
   a memory,
   one or more software modules, stored in the memory, executable by the one or more processors, and comprising:
      a receiving module, configured to receive data by a simulating device from a client operating system;
      an encapsulating module, configured to encapsulate by the simulating device the data in a user space of a host system according to a protocol used by a storage server;
      a sending module, configured to send by the simulating device encapsulated data to the storage server for storage;
   wherein, the simulating device is achieved on the host system based on a virtual machine monitor, the simulating device is a block device of a Peripheral Component Interconnect standard PCI interface, the client operating system is configured to drive the simulating device using a block device driver, and the client operating system is running on the virtual machine monitor.

8. The electronic device according to claim 7, wherein, data is transferred between the simulating device and the client operating system by a means of sharing memory, and data access is realized by passing a physical address of a memory stored with the data between the simulating device and the client operating system.

9. The electronic device according to claim 7, wherein the sending module is configured to send the encapsulated data to the storage server for storage through a network communication protocol stack.

10. The electronic device according to claim 9, wherein the sending module is configured to send the encapsulated data to a proxy server of the storage server, such that the proxy server sends the encapsulated data to the storage server for storage through the network communication protocol stack.

11. The electronic device according to claim 10, wherein the proxy server is configured to use an extensible architecture.

12. The electronic device according to claim 10, wherein the sending module is further configured to retransmit the data that is not transmitted completely before the proxy server is restarted, when the proxy server restarts to upgrade or by defect.

13. A non-volatile computer storage medium, stored with one or more modules that, when executed, perform following operations:
   receiving data by a simulating device from a client operating system;
   encapsulating by the simulating device, the data in a user space of a host system according to a protocol used by a storage server;
   sending by the simulating device, encapsulated data to the storage server for storage;
   wherein, the simulating device is achieved on the host system based on a virtual machine monitor, the simulating device is a block device of a Peripheral Component Interconnect standard PCI interface, the client operating system is configured to drive the simulating device using a block device driver, and the client operating system is running on the virtual machine monitor.

* * * * *